(12) United States Patent
Kulagin et al.

(10) Patent No.: US 10,893,057 B2
(45) Date of Patent: *Jan. 12, 2021

(54) HARDWARE SECURITY MODULE SYSTEMS AND METHODS

(71) Applicant: AO KASPERSKY LAB, Moscow (RU)

(72) Inventors: Dmitry A. Kulagin, Moscow (RU); Pavel V. Dyakin, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,533

(22) Filed: Aug. 28, 2020

(65) Prior Publication Data

US 2020/0396229 A1 Dec. 17, 2020

Related U.S. Application Data

(63) Continuation of application No. 16/005,158, filed on Jun. 11, 2018, now Pat. No. 10,778,695.

(30) Foreign Application Priority Data

Feb. 6, 2018 (RU) .................................. 2018104435

(51) Int. Cl.
*H04L 29/06* (2006.01)
*H04L 9/32* (2006.01)
(Continued)

(52) U.S. Cl.
CPC ........ *H04L 63/123* (2013.01); *G06F 11/3476* (2013.01); *G06F 21/64* (2013.01);
(Continued)

(58) Field of Classification Search
CPC .... H04L 63/123; G06F 11/3476; G06F 21/64; G06F 21/68
See application file for complete search history.

(56) References Cited

U.S. PATENT DOCUMENTS

| 5,226,079 A | 7/1993 | Holloway |
| 5,978,475 A | 11/1999 | Schneier et al. |

(Continued)

FOREIGN PATENT DOCUMENTS

| KR | 100829977 | 5/2008 |
| WO | WO2005059752 | 6/2005 |
| WO | WO2005098564 | 10/2005 |

OTHER PUBLICATIONS

European Search Report for European Application No. 18182892 dated Nov. 14, 2018.
(Continued)

*Primary Examiner* — William S Powers
(74) *Attorney, Agent, or Firm* — Patterson Thuente Pedersen, P.A.

(57) ABSTRACT

Systems and methods for ensuring data security. A MAC is computed sequentially for each selected message from a data log that contains at least two messages. To build a data block, a preset encryption key is used for a first message and an encryption key for the previous message is used for subsequent messages. A determination that the data log is compromised can be made based on MAC data block data and an independent calculation of a MAC.

18 Claims, 4 Drawing Sheets

(51) Int. Cl.
  *G06F 11/34*    (2006.01)
  *G06F 21/86*    (2013.01)
  *G06F 21/64*    (2013.01)
  *H04L 9/08*     (2006.01)

(52) U.S. Cl.
  CPC ............ *G06F 21/86* (2013.01); *H04L 9/0877* (2013.01); *H04L 9/3242* (2013.01); *H04L 63/12* (2013.01); *G06F 2221/2107* (2013.01); *H04L 2209/38* (2013.01)

(56) References Cited

U.S. PATENT DOCUMENTS

| | | | |
|---|---|---|---|
| 6,725,240 | B1 | 4/2004 | Asad et al. |
| 6,898,709 | B1 * | 5/2005 | Teppler ................. H04L 9/3263 713/178 |
| 7,305,558 | B1 | 12/2007 | Miyazaki et al. |
| 7,770,032 | B2 | 8/2010 | Nesta et al. |
| 7,853,799 | B1 | 12/2010 | Trimberger |
| 8,230,228 | B2 | 7/2012 | Hahn et al. |
| 8,316,240 | B2 | 11/2012 | Graziani |
| 8,386,774 | B2 | 2/2013 | Lin |
| 8,422,682 | B2 | 4/2013 | Ortiz et al. |
| 9,338,013 | B2 | 5/2016 | Castellucci et al. |
| 10,505,847 | B1 * | 12/2019 | Singarayan ......... H04L 61/6022 |
| 2001/0044886 | A1 * | 11/2001 | Cassagnol ........... G06F 21/6245 711/163 |
| 2003/0236992 | A1 | 12/2003 | Yami |
| 2007/0288768 | A1 | 12/2007 | Nesta et al. |
| 2008/0037791 | A1 | 2/2008 | Jakobsson |
| 2008/0098232 | A1 | 4/2008 | Miyazaki et al. |
| 2009/0016534 | A1 | 1/2009 | Ortiz Cornet et al. |
| 2009/0228701 | A1 | 9/2009 | Lin |
| 2010/0115284 | A1 | 5/2010 | Hahn et al. |
| 2010/0218002 | A1 | 8/2010 | Graziani |
| 2015/0188715 | A1 | 7/2015 | Castellulcci et al. |
| 2016/0219024 | A1 * | 7/2016 | Verzun ................. H04L 9/0662 |
| 2017/0012969 | A1 | 1/2017 | Li |
| 2017/0180370 | A1 | 6/2017 | Satoh et al. |
| 2019/0028267 | A1 | 1/2019 | Takemori et al. |
| 2019/0245864 | A1 | 8/2019 | Kulagin et al. |

OTHER PUBLICATIONS

Application and File History for U.S. Appl. No. 16/005,158, filed Jun. 11, 2018, inventors Kulagin et al.

* cited by examiner

HARDWARE SECURITY MODULE SYSTEMS AND METHODS

RELATED APPLICATION

This continuation application claims the benefit of U.S. patent application Ser. No. 16/005,158 filed Jun. 11, 2018, which claims the benefit of Russian Application No. 2018104435, filed Feb. 6, 2018, which is fully incorporated by reference herein.

TECHNICAL FIELD

The invention relates to data storage technologies, and more specifically, to systems and methods for ensuring information security of data using a limited amount of computing resources.

BACKGROUND

Recent rapid development of computer technologies, along with the prevalence of various computing devices (personal computers, notebooks, smartphones, etc.), and especially embedded systems (microcontrollers, data storage systems, etc.), has led to the use of such devices in various areas of activity and for a large number of tasks (from Internet surfing to refrigerator control to collection of data from car sensors). In parallel with the growth of the number of computing devices being used, the volume of the data processed by such devices has been increased as well, which, in turn, has made vital ensuring information security of the data being gathered and processed.

Use of inaccurate or incomplete information can cause significant damages and financial losses. For example, in the banking sector, substitution of personal data of users can result in losses of funds by bank clients. In the financial sector, inaccurate or incomplete information can cause multibillion losses and paralyze stock exchange operations. In the insurance sector, forged information can result in illegal payments and cause losses to insurance companies.

To ensure information security of data, i.e. to protect data against modification, deletion or substitution, various technologies are currently being used, including data backup, symmetric and asymmetric encryption of data, antinoise coding of data and blockchain technologies.

For example, U.S. Patent Application Pub. No. 2003/0236992 describes a system for protecting data logs against unauthorized modification. In order to acknowledge each message from the said log, symmetric encryption keys and message authentication codes are used. Each newly received message from the data log is encrypted with a symmetric key computed on the basis of previously received messages; for confirmation of the correctness of the message, a message authentication code is computed and associated with the current message. This allows determination of any changes made to the log after the processing of the previous message and before the processing of the current message.

The above-described system can protect data from modification, deletion or substitution, but only when sufficient computing resources are available (processor time, RAM, space on removable media, etc.). Further, such solutions lack efficiency when the amount of computing resources or the time allowed for data processing is limited.

Thus there is a need for ensuring information security of data using a limited amount of computing resources.

SUMMARY

Embodiments solve the problems described above to ensure information security of data using a limited amount of computing resources.

In an embodiment, a system for detecting compromised data comprises a computing platform including computing hardware of at least one processor and memory operably coupled to the at least one processor; instructions that, when executed on the computing platform, cause the computing platform to implement: an encryption key building tool configured to build an initial preset key based on at least one characteristic of the encryption key building tool, and build an encryption key based on a previously-built key; a message association code (MAC) computing tool configured to receive the initial preset key and the encryption key from the encryption key building tool, intercept a first message related to an event and a second message related to the event, and generate a MAC sequentially for the first message and the second message, wherein the MAC is generated for the first message based on the initial preset key and the first message, and the MAC is generated for the second message based on the encryption key for the second message and a data block built for the second message including the second message and the MAC generated for the first message, and wherein the previously-built key for the second message is the initial preset key, write a record to a data log, the record including the first and second messages and the MAC generated for the second message, and write data log records from the data log to a message base; a check determination tool configured to intercept the event based on preset rules, and determine whether to perform a data compromise check using the intercepted event and the message base data; and a check tool configured to analyze each record received from the check determination tool to determine whether the MAC in the record matches an expected MAC, and indicate data is compromised when the MAC in the record does not match the expected MAC.

In an embodiment, a method for detecting compromised data in a data log comprises computing a MAC sequentially for a first message in the data log and a second message in the data log, wherein the MAC is generated for the first message based on an initial preset key and the first message, and the MAC is generated for the second message based on an encryption key for the second message and a data block built for the second message including the second message and the MAC generated for the first message, and wherein the previously-built key for the second message is the initial preset key; writing a record to a message database, the record including the first and second messages and the MAC generated for the second message; analyzing each record to determine whether the MAC in the record matches an expected MAC; and indicating data is compromised when the MAC in the record does not match the expected MAC.

In an embodiment, a system for detecting compromised data in a vehicle data log comprises a vehicle including at least one vehicle sensor engine configured to detect a first characteristic of the vehicle at a first time and write a first message including the first characteristic of the vehicle and a first timestamp corresponding to the first time to the vehicle data log, and detect a second characteristic of the vehicle at a second time and write a second message including the second characteristic of the vehicle and a second timestamp corresponding to the second time to the vehicle data log, at least one processor and a memory operably coupled to the at least one processor comprising instructions that, when executed on the at least one processor, cause the at least one processor to implement a message association code (MAC) computing tool configured to generate a MAC sequentially for the first message and the second message, wherein the MAC is generated for the first message based on an initial preset key and the first message, and the MAC is generated for the second message based on the encryption key for the second message and a data block built for the second message including the second message and the MAC generated for the first message, and wherein the previously-built key for the second message is the initial preset key, write a data record, the record including the first and second messages and the MAC generated for the second message; and a server operably coupled to the vehicle and including a message base configured to store data records, at least one server processor and a server memory operably coupled to the at least one server processor comprising instructions that, when executed on the at least one server processor, cause the at least one server processor to implement a check determination tool configured to receive the first message or the second message, and determine whether to perform a data compromise check using the received message and the data records; and a check tool configured to analyze each data record received from the check determination tool to determine whether the MAC in the data record matches an expected MAC, and indicating data is compromised when the MAC in the data record does not match the expected MAC.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
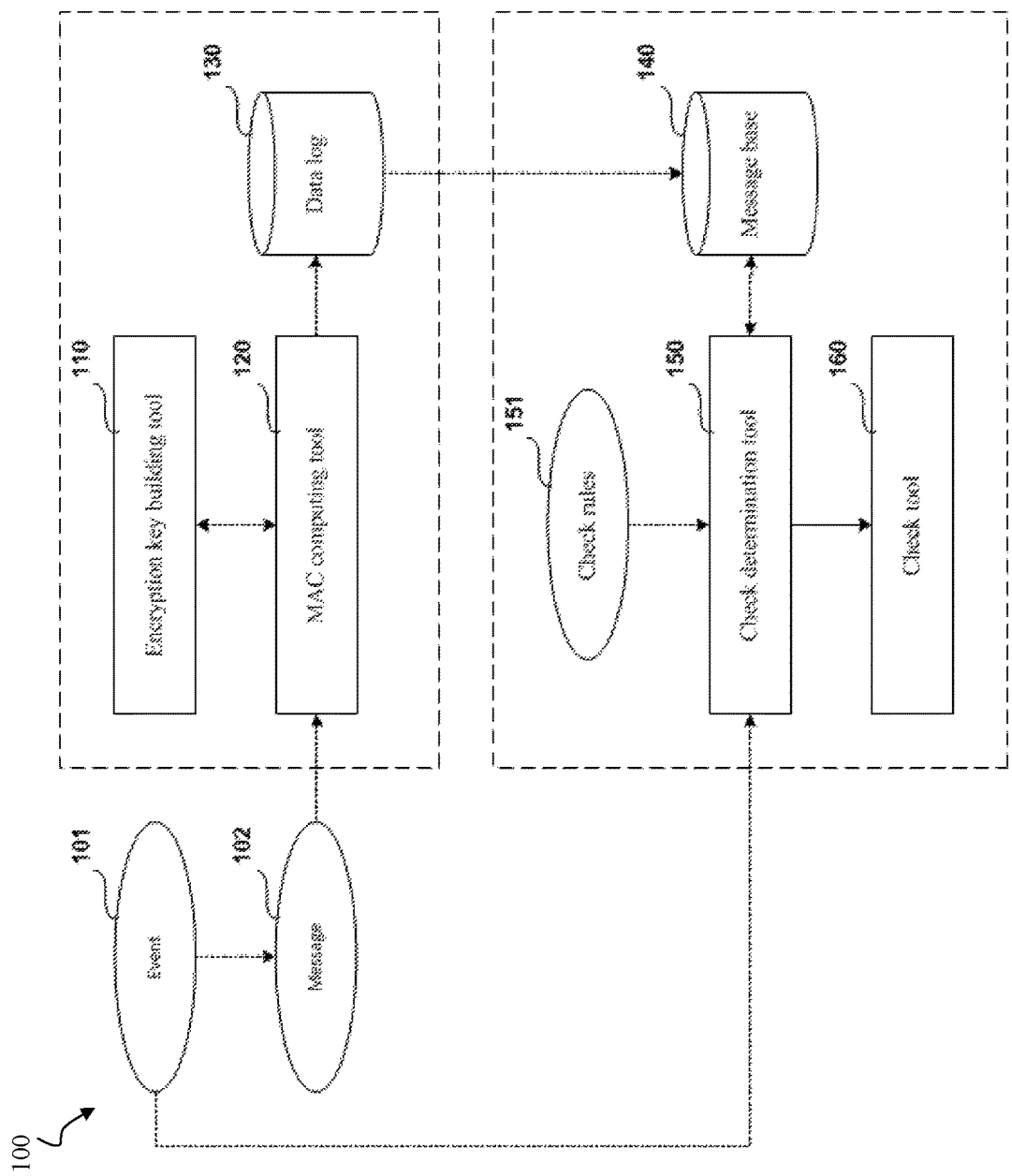
FIG. 1 is a block diagram of a system for detecting compromised data, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The purpose of embodiments described herein is to ensure information security of data. The technical result of the present invention consists in determining occurrences of any compromised data by analyzing the differences between MACs (Message Association Codes) computed based on the data.

Accordingly, technical results are achieved by using a data compromise determination system, which, in an embodiment, includes a MAC computing tool, configured to compute a MAC sequentially for each selected message from a data log that contains at least two messages; computing of a MAC includes: for the first selected message, computing of a MAC on the basis of a preset encryption key and of the selected message; for each subsequent message after the first selected message, building an encryption key on the basis of the encryption key built for the previously selected message; building a data block on the basis of the selected message and of the MAC computed for the previously selected message; computing a MAC on the basis of the built encryption key and data block; writing to the message base a record containing the last computed MAC and all selected messages; a check determination tool configured to: intercept an event matching preset rules, such event occurring when a message is recorded in the data log; determine whether it is necessary to perform a check for data compromise on the basis of the intercepted event and subsequently transmit the record selected from the message base to the check tool; a check tool configured to analyze the record including: computing a MAC sequentially for each message contained in the received record, which includes: for the first message, computing a MAC on the basis of a preset encryption key and of the selected message; for each subsequent message after the first message, building an encryption key on the basis of the encryption key built for the previously selected message; building a data block on the basis of the selected message and of the MAC computed for the previously selected message; computing a MAC on the basis of the built encryption key and data block; comparing the computed MAC to the MAC contained in the selected record; determining that the data is compromised if the computed MAC does not match the MAC contained in the selected record.

In an embodiment, a data log analysis tool and a message base interaction tool operate on a client side, while a message base interaction tool, record analysis tool and determination tool operate on a server side.

In an embodiment, an encryption key is built by the data compromise determination system using a cryptographic hash function.

In an embodiment, a message base interaction tool saves the record to the message base upon request.

In an embodiment, a method for determining compromised data includes processing performed using tools from data compromise determination systems. For example, processing can include a MAC computed sequentially for each selected message from a data log containing at least two messages; for this purpose, for the first selected message, a MAC is computed on the basis of a preset encryption key and of the selected message; for each subsequent message after the first selected message, an encryption key is built on the basis of the encryption key built for the previously selected message; a data block is built on the basis of the selected message and of the MAC computed for the previously selected message; a MAC is computed on the basis of the built encryption key and data block; a record containing the last computed MAC and all selected messages is saved to the message base; an analysis of each selected record from the message base is performed, for which purpose, the first MAC computing stage is performed sequentially for each message contained in the selected record; the computed MAC is compared to the MAC contained in the selected record; on the basis of a negative result of the performed comparisons, it is determined that the data log is compromised.

In embodiment, encryption key building and MAC computing can be performed on the client side, while record analysis and whether data is compromised are performed on the server side.

In an embodiment, an encryption key is built by the method for determining compromised data using a cryptographic hash function.

The objects and characteristics of this invention and the methods for achieving these objects and characteristics will become clear by reference to example embodiments. However, this invention is not limited to the example embodiments disclosed herein and can be implemented in various forms. The substance provided in the description represents nothing else than specific details required in order to help one skilled in the art fully understand the invention; this invention is defined within the scope of the enclosed claims.

As referenced throughout this disclosure, certain terms will be readily understood by one of skill in the art. For example, message authentication can include protection of an encryption communication system or another encryption system against imposition of false data. Put another way, Message authentication provides protection of data against unauthorized modifications or protection of message integrity.

In another example, a Message Association Code (MAC) can be an element of ensuring message authentication with message authentication protocols with participants trusting each other. In an embodiment, MACs can comprise a special set of symbols added to a message and intended for message integrity verification and data source authentication.

In another example, a symmetric-key algorithm can include a data encryption system or process where the same cryptographic key is used for encryption and decryption of the data.

In another example, an asymmetric-key algorithm (for example, a public key cryptographic system) can include an encryption system or process where a public key is sent using a public (i.e. unprotected or observable) channel and used to encrypt the message. To decrypt the message, a private key is used. The private key remains secret with the person who needs to decrypt the encrypted data; the private key is not provided to anyone else.

In another example, cryptographic strength (or crypto-strength) can include the ability of a cryptographic algorithm to resist cryptanalysis. An algorithm can be considered strong if a successful attack on it requires the attacker to have a practically unattainable amount of computing resources or intercepted open or encrypted messages, or such significant time spent on decryption that the protected information will lose its value by the time it is decrypted.

Referring to FIG. 1, a block diagram of a system 100 for detecting compromised data is depicted, according to an embodiment. Data compromise determination system 100 generally includes a data log 130, an encryption key building tool 110, a MAC computing tool 120, a message base 140, a check determination tool 150, and a check tool 160.

Some of the subsystems of system 100 includes various engines or tools, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an embodiment, system 100 is configured on a client-server architecture: the client side comprises data log 130 and executes the encryption key building tool 110 and the MAC computing tool 120; the server side comprises message base 140, check rules 151, and executes the check determination tool 150 and the check tool 160.

For example, the client portion can be located in a car and collect data on the car's behavior parameters for an insurance company, while the server portion can be located at the insurance company (work using the insurance company's equipment). In this case, the client portion can be vulnerable to malicious attacks (for example, attempts to modify data on the car's behavior parameters—speed, engine running characteristics, geolocation, etc.), while the server portion can be reliably protected against any kind of malicious attacks, since the results of client data analysis using the server part resources is trusted. Additional detail regarding such an embodiment is described further in FIG. 3.

Events 101 can occur in system 100 in response to various external actions. In an embodiment, a resulting at least one message 102 is built for each event. A message 102 can represent data including a characterization of the event 101, and/or a time stamp.

For example, at each 0.01 sec (event 101—occurrence of data collection time), a sensor installed in the car's engine, receives an engine RPM value. On the basis of the data received, a message 102 is built, which includes information on the time of the event's occurrence, event type, and event characteristics:

163625324→timer→engine→RPM→8450 and having the following hex format:

0x09C0B96C00010210000100002102.

The encoding key building tool 110 is configured for building an initial pre-shared key, $pk_0$ based on the characteristics of the encryption key building tool 110 and building an encryption key $pk_n$ based on the previously built encryption key:

$$pk_n = g(pk_{n-1}).$$

where:
g is the encryption key building function;
$pk_{n-1}$ is the previously built encryption key;
$pk_n$ is the current built encryption key;
Encryption key building tool 110 is further configured for sending the built encryption key to the MAC computing tool 120.

In one embodiment, the encryption keys are built upon request from the MAC computing tool 120.

In yet another embodiment, the characteristics of the encryption key building tool 110 are represented by the time received from precise clock built in the encryption key building tool 110.

In yet another embodiment, the initial pre-shared key $Pk_0$ is built based on at least one of the following: the time of the first message sample 102 $m_1$, or the time of the occurrence of the event 101 characterized by the first message 102 $m_1$.

In another embodiment, the encryption key building tool 110 provides a Hardware Security Module (HSM) or a program tool operating at the HSM. The HSM is physically hacker-protected, making it impossible to gain unauthorized access to the functionality of the encryption key building tool 110. In other words, the HSM physically protects against malicious attempts to gain control of the encryption key building tool 110 or to obtain data from the control of the encryption key building tool 110, and so on.

In yet another embodiment, the initial pre-shared key $pk_0$ is contained in the encryption key building tool 110 and is set in advance, before the beginning of the data compromise determination system operation. For example, when an HSM is used, the initial pre-shared key is built during the creation and programming of the HSM.

In an embodiment, the encryption key is built using a unilateral cryptographically strong hash function. In yet another embodiment, at least the following is used as the cryptographic hash function for building the key: a public key asymmetric encryption function; in this case, a public cryptographic key is contained in the encryption key building tool 110 and is set in advance, before the beginning of system operation, while a private cryptographic key is contained in the check tool 160; or a cryptographic key symmetric encryption function; in this case, the said cryptographic key is contained in the encryption key building tool 110, in the check tool 160, and is set in advance, before the beginning of system operation.

Therefore, the use of a physically hacker-protected tool, and the use of methods of encryption of built encryption keys, etc., ensure computer-based cryptographic strength of the built encryption keys, which inhibits or prevents offenders from building their own encryption keys using substituted characteristics of the encryption key building tool 110 (for example, the time of encryption keys building, and the time of creation of messages 102).

When an asymmetric encryption function is used as the cryptographic hash function for building the encryption key, a server side can confirm the validity of the encryption key being used (and thereby determine if the encryption key was forged). When a symmetric encryption function is used as the cryptographic hash function for building the encryption key, the server side can decrypt the encryption key being used and obtain the data which were used to build the encryption key (and thereby exclude any forged encryption key).

The MAC computing tool 120 is configured for intercepting at least two built messages 102 and then computing a MAC sequentially for each intercepted message 102. In an embodiment the computation of the MAC (Algorithm I) includes: for the first intercepted message $m_1$:
computation of a MAC on the basis of the encryption key requested from the encryption key building tool 110 $pk_1$ and of the intercepted message $m_1$:

$$\mu_1 = f(m_1, pk_1).$$

where:
f is the cryptographic function;
$pk_1$ is the preset encryption key;
$m_1$ is the 1st message;
$\mu_1$ is the MAC for the message $m_1$;
for each subsequent message after the first intercepted message $m_n$:
building of a data block using the intercepted message $m_n$ and the MAC $\mu_{n-1}$ computed for the message intercepted earlier:

$$b_n = h(\mu_{n-1}, m_n),$$

where:
h is the data block building function (data block building rules);
$b_n$ is the n-th data block;
$m_n$ is the n-th message;
$\mu_{n-1}$ is the MAC for the message $m_{n-1}$;
computing a MAC using the encryption key requested from the encryption key building tool 110 $pk_n$ and the built data block $b_n$:

$$\mu_n = f(b_n, pk_n),$$

where:
f is the cryptographic function;
$pk_n$ is the encryption key for the n-th message;
$b_n$ is the n-th data block;
$\mu_n$ is the MAC for the message $m_n$.

In embodiments, the MAC computing tool 120 is further configured for writing a record to the data log 130, such record containing the last computed MAC and all intercepted messages, and writing data from the data log 130 to the message base 140.

In one embodiment, before the processing of the first intercepted message 102, the initial pre-shared key is requested from the encryption key building tool 110. This pre-shared key is built using a method different from the building of subsequent keys. During the processing of the first and of the subsequent intercepted messages 102, encryption keys can be requested from the encryption key building tool 110 which can be built using the same method for all similar types of keys.

In yet another embodiment, all intermediary results of the processing of intercepted messages 102 (including computed MACs, except the last one, built data blocks, requested encryption keys, etc.) are deleted from the system upon completion of the writing of the above-mentioned record to the database 130. Therefore, the absence of the above-mentioned intermediary data does not allow offenders to build their records to the data log 130 using substituted messages 102.

In yet another embodiment, if writing to the data log 130 appears impossible due to limited amount of available computing resources (for example, as a result of or caused by previous records to the data log 130), the following can be performed: first, the data log 130 is deleted (thereby freeing the computing resources), and a new (blank) data log 130 is created (the information from the old data log 130 is lost). Second, the first building of a MAC after the creation of a new data log 130 is performed using the initial pre-shared key requested from the encryption key building tool 110.

Therefore, the encryption key building tool 110 provides keys using the following pattern:

$$pk_0(\text{param}_1) \to g(pk_0) \to g(pk_1) \to \ldots \to g(pk_{n-1}) \to \ldots$$
$$\text{deletion creation} \ldots \to pk_0(\text{param}_2) \to g(pk_0) \to g(pk_1) \to \ldots \to g(pk_{n-1})$$

For example, after the data log 130 is completely filled (there are no available computing resources), data from the data log 130 are lost, and the data log itself 130 starts to be filled from the beginning (i.e. the client side has available computing resources again).

In yet another embodiment, HSM tools provide both the time and the key (depending on that time). Therefore, during a subsequent check, it is possible to restore the initial key, (knowing the time) and to analyze the time and assess how plausible it is.

In traditional systems, when a device is compromised, nothing prevents the attacker from deleting the existing log, requesting a new key and building a new log, filling the latter with random events, allegedly from the past. However, when an HSM comprising the aforementioned features is utilized, such an attack is difficult to make because the initial key will be rigidly bound with real time. This means that the attacker will not be able to send records to the past (i.e. to assign the records earlier creation times than the actual ones). This is the essence of the protection described herein. Since an HSM includes or generates the time itself, (for example, an HSM can include a real-time clock), anti-hacker requirements are also needed in order to prevent an attacker from manipulating this tool (the clock).

In yet another embodiment, a number of accessible resources for the data compromise determination system can be utilized (and accordingly used or exhausted). For example, space on an information medium allocated for storage of the data log 130 can be limited. In this case, the information medium is a part of the client side of the system (if it is built using a client-server architecture). In another example, processor time allocated to the MAC computing tool 120 for analysis of intercepted messages 102 can be exhausted. In another example, parameters of the connection between the tools of client-side and server-side parts of the system, which characterize the possibility of performing a write and read of data from the message base 140 can be utilized (i.e. the speed of writing data to the message base 140). In another example, the maximum size of a message 102 that can be written to the data log 130 or analyzed by the MAC computing tool 120 can be exhausted.

In one example, for the storage of the data log 130, 100 Mb of free space are allocated on the media of the client-side portion of the system. If one message takes 1 Kb of storage and is written by the MAC computing tool 120 to the data log 130 each second (for example, in a moving car), the data log will be filled (all allocated available space will be used up) in ~28 hours. When designing the system, the developers counted that, in one day, a connection would be definitely established between the client-side and the server-side portions of the system, and the data from the data log 130 would be written to the message base 140 after being analyzed by the MAC computing tool 120. If only 1 Mb of free space were allocated for the data log 130 (such memory spaces, or even lesser ones, exist in many built-in systems), then the data log 130 would be filled in 17 minutes, and a situation could occur where data would not be sent to the server-side portion and would be lost (or overwritten).

In yet another embodiment, the built data block contains a selected message and a MAC computed for the previously selected message.

In yet another embodiment, the writing of data from the data log 130 to the message base 140 is performed at least: at any moment if there is a connection between the client-side and the server-side parts of the data compromise determination system; using a preset time after the previous successful write of data from the data log 130 to the message base 140; upon processing of messages 102 exceeding the preset number; or if a preset amount of available data compromise determination system resources is available.

In an embodiment, once all data from the data log 130 are written to the message base 140, the data log is cleared, and the next message 102 written to the data log 130 is considered to be the first message. In other words, the data log 130 is deleted (thereby freeing computing resources), and a new (blank) data log 130 is created. The first building of a MAC after the creation of a new data log 130 is performed using the initial pre-shared key requested from the encryption key building tool 110.

The data log 130 is a database containing messages 102 processed by the MAC computing tool 120.

In one embodiment, the characteristics of the data log 130 are defined by the resources available in the system. In another embodiment, at least the following are used as characteristics of the data log 130: the maximum number of messages (records) 102 that can be written to the data log 130; or the maximum amount of data (total amount of the written messages 102) that can be written to the data log 130. In yet another embodiment, the data log 130 is configured so as to additionally store the order of the messages 102 written to it.

The message base 140 is a database containing data sent by the MAC computing tool 120, which data contain, in each record, at least a combination of the messages 102 and the last computed MAC.

The check determination tool 150 is configured for intercepting the event 101 meeting preset rules 151. For example, the event 101 occurs if the message 102 is written to the data log 130. The check determination tool 150 is further configured for determining whether to perform a data compromise check using an intercepted event 101 and the transmission of the selected record from the message base 140 to the check tool 160.

In one embodiment, a decision to perform a data compromise check is made at least in the following cases: an interception of an event of writing of data to the data log 130, or a stable connection between the client-side and the server-side parts of the data compromise determination system.

The check tool 160 is configured to analyze, upon request, each record received from the determination tool 150. In an embodiment, such analysis includes computation of a MAC sequentially for each message contained in the received record, using Algorithm I, comparison of the computed MAC to the MAC contained in the selected record, and a determination as to whether data log 130 has been compromise if the computed MAC does not match the MAC contained in the selected record.

In one embodiment, the messages 102 from the record are selected in the order they were placed in the said record.

In another embodiment, the preset encryption key used in the MAC computing tool 120 and the preset encryption key used in the check tool 160 are identical and are set when building the data compromise determination system.

In yet another embodiment, the preset encryption key used in the check tool 160 is built using the time stamp contained in the record selected from the message base 140.

In another embodiment, the encryption key is built using a cryptographic hash function.

In yet another embodiment, a public key asymmetric encryption function can be used as the cryptographic hash function for building the encryption key. For example, a public cryptographic key is contained in the encryption key building tool 110 and is set in advance, before the beginning of system operation, and a private cryptographic key is contained in the check tool 160. In another example, a cryptographic key symmetric encryption function can be used as the cryptographic hash function for building the encryption key. For example, the cryptographic key can be contained in the encryption key building tool 110, in the check tool 160, and is set in advance, before the beginning of system operation.

In yet another embodiment, the built data block contains a selected message and a MAC computed for the previously selected message.

In yet another embodiment, the comparison of MACs is made bit by bit.

In yet another embodiment, the data log 130 is considered to be compromised if the MACs being compared do not match. For example, one MAC computed by the MAC computing tool 120 and the other MAC computed by the check tool 160 can be compared.

In another embodiment, at least the following are additionally analyzed in order to determine whether the data log 130 is compromised: the encryption keys built by the check tool 160 using data selected from the record; and/or the time characteristics of the building of messages 102 contained in the selected records.

The following discussion of operation of a system 100 describes vehicle operation characteristics. In order to make decisions on insurance payments in case of an accident, an insurance company installs in their clients' cars a system collecting data from the car's sensors. Based on the analysis of the collected data, the vehicle's operation characteristics are determined—whether it was speeding at the time of the accident, where it was moving, what actions the driver took when operating the vehicle, and so on. The determined operation characteristics are used to determine insurance payments, the cost of the vehicle's insurance (if the person drives "aggressively, exceeds speed limits, etc., the insurance cost increases). Compromise of collected data can result in erroneous analysis and financial losses to the insurance company (for example, a vehicle's speed at the time of an accident was artificially understated, which caused errors in the insurance claim determination and resulted in extra payments).

When a vehicle speedometer sensor is actuated, a "speed change" #1 101 occurs, characterized by the vehicle's current speed and by the stamp of the time when the said speed was registered (when the event #1 101 occurred); for example, v=85.75 km/h t=106725653.232 (conventional time units, e.g. in Unix time format).

The above-mentioned event #1 101 initiates the building of a message $m_1$ 102, containing the above-listed data:

$v=85.75 km/h, t=1067256253,232$ and subsequent writing of the message to the data log 130. After that, the MAC computing tool 120, which is a component of the client-side portion of the data compromise determination system, computes a MAC using the encryption key $K_1$ and the message $m_1 102$ $^{\mu 1}$ and writes the MAC to the message base 140.

The event #1 101 is also sent to the check determination tool 150, which is a component of the server-side portion of the data compromise determination system. Based on the check rules 151 and on the received data (in this case, the event #1 101), a determination is made whether it is necessary to perform a data compromise check based on the intercepted event #1 101. For example, one of the rules can be a sharp change of the vehicle's speed or an acceleration exceeding a preset value (for example, 2g). Such data can come from another speedometer sensor. In an embodiment, as long as no such event is registered, a data compromise check is not made.

Until the check determination tool 150 makes a relevant determination, the data are saved to the data log 130 and to the message base 140.

When another vehicle speedometer sensor is actuated, a "speed change" #N 101 occurs, characterized by the vehicle's current speed and by the stamp of the time when the said speed was registered (when the event #1 101 occurred); for example, v=15.21 km/h, t=1067279253008.

The above-mentioned event #1 101 initiates the building of a message $m_n$ 102, containing the above-listed data:

V=15.21 km/h, t=1067279.008.

and subsequent writing of the message to the data log 130. After that, the MAC computing tool 120, which is a component of the client-side part of the data compromise determination system, computes a MAC using the encryption key $K_n$ and the message $m_n$ 102 $\mu_n$ and writes the MAC to the message base 140.

The event #N 101 is also sent to the check determination tool 150. Based on the check rules 151 and on the received data (in this case, the event #N 101), a determination is made whether it is necessary to perform a data compromise check based on the intercepted event #N 101. It is determined that the speed change exceeded the preset threshold value (for example, $\Delta v$=50 km/h) and that the acceleration also exceeded the preset threshold value (for example, g=5.6). As a result, the check determination tool 150 sends a request to the check tool 160 on the need to perform a check of the data written in the message base 140.

The check tool 160 selects sequentially all records from the message base 140 and re-computes MACs anew for all the messages contained in the selected records (using the same methods as the MAC computing tool 120 does). Subsequently, the check tool 160 compares the resulting final MAC to the MAC contained in the last selected record. If the MAC values differ, it is determined that the data log 130 is compromised. In embodiments where the data contain information collected from the vehicle's sensors, a conclusion can be made that the system's user (the vehicle's owner) tried to falsify data from sensors in order to conceal information on the vehicle's condition. As a result, the insurance company has grounds to deny insurance payments to the user or to revise the terms of insurance.

Figure 2:
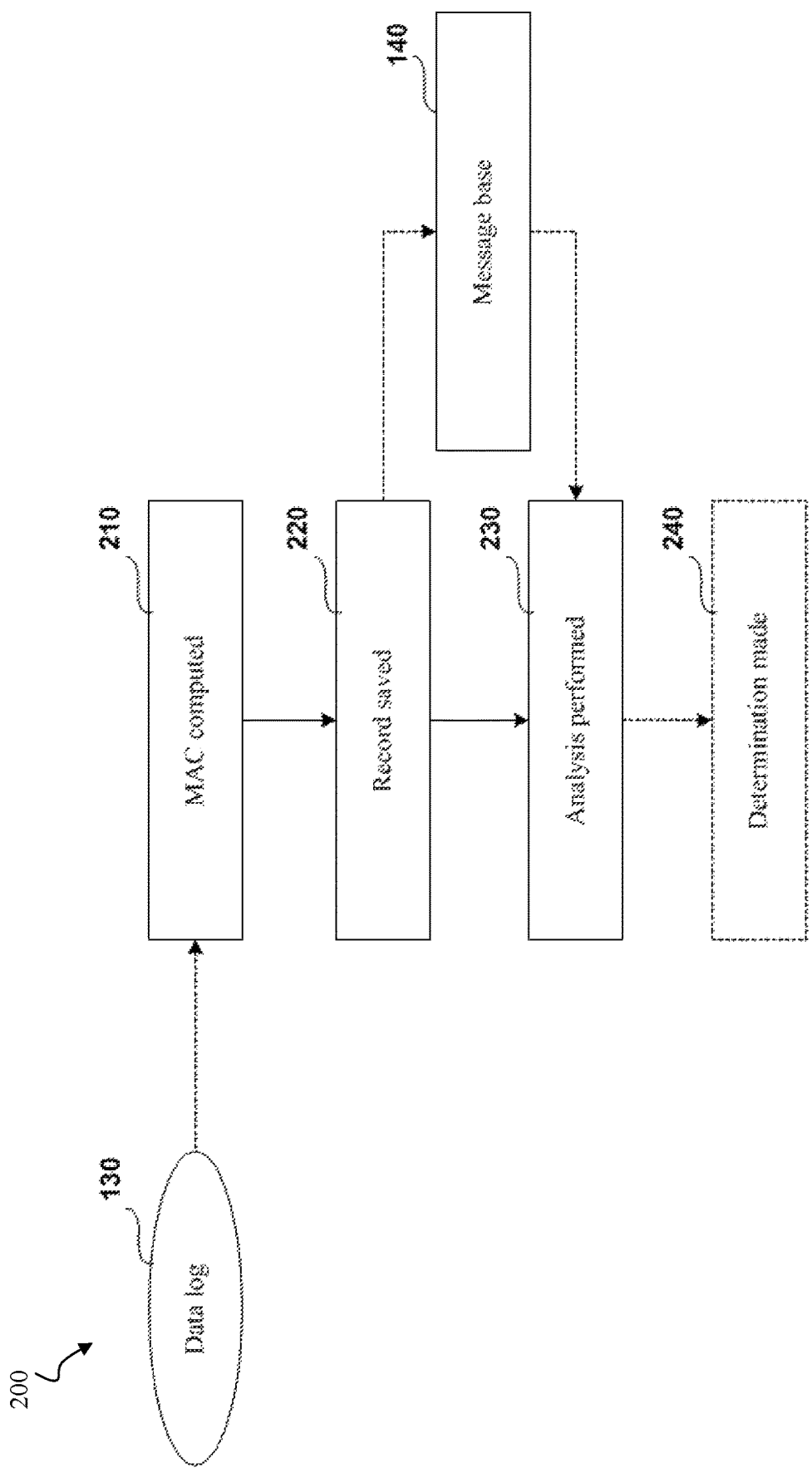
FIG. 2 is a flowchart of a method for detecting compromised data, according to an embodiment.

Referring to FIG. 2, a flowchart of a method 200 for detecting compromised data is depicted, according to an embodiment. In general, method 200 generally comprises computing a MAC at, saving a record at 220, performing an analysis at 230, analysis is performed, and making a determination of compromised data at 240.

More particularly, at 210, a MAC is computed sequentially for each selected message from a data log 130 containing at least two messages 102. For example, for the first selected message a MAC is computed using a preset encryption key and a selected message. For each subsequent message after the first selected message, an encryption key is built based on the encryption key which was built for the previously selected message, a data block is built using the intercepted message and the MAC computed for the message selected earlier, and a MAC is computed using the built encryption key and data block.

At 220, a record containing the last MAC computed at 210 and all the messages selected at 210 are saved to the message base 140.

At 230, analysis of each selected record from the message base 140 is performed. For example, by performing the processing described above for the first selected message and the second selected message at 210, a MAC is computed sequentially for each message contained in the selected record. A final computed MAC is compared to the MAC contained in the selected record.

At 240, based on the result of the comparisons made at 230, a determination is made as to whether the data log 130 is compromised.

Figure 3:
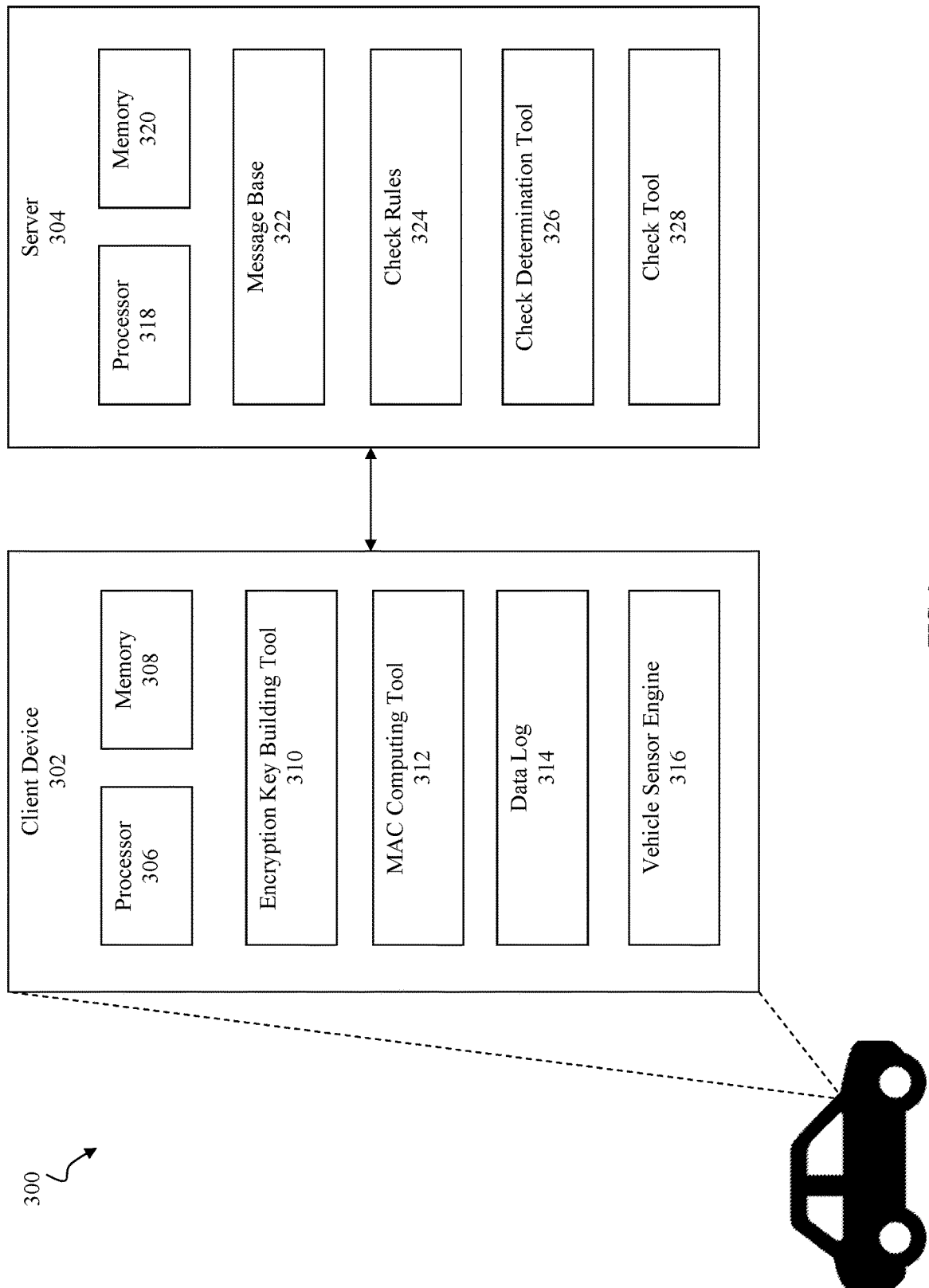
FIG. 3 is a block diagram of a system for detecting compromised vehicle data, according to an embodiment.

Referring to FIG. 3, a block diagram of a system 300 for detecting compromised vehicle data is depicted, according to an embodiment. In embodiments, the system 300 can implement the method 200 for vehicle data as described above.

In an embodiment, system 300 generally comprises a vehicle client device 302 and a server 304. In embodiments, client device 302 and server 304 can be operably coupled by a network such that they are consistently or intermittently in communication.

Client device 302 generally comprises a processor 306 and operably coupled memory 308. The processor 306 can be any programmable device that accepts digital data as input, is configured to process the input according to instructions or algorithms, and provides results as outputs. In an embodiment, the processor 306 can be a central processing unit (CPU) configured to carry out the instructions of a computer program. The processor 306 is therefore configured to perform at least basic arithmetical, logical, and input/output operations.

The memory 308 operably coupled to the processor 306 can comprise volatile or non-volatile memory as required by the coupled processor 306 to not only provide space to execute the instructions or algorithms, but to provide the space to store the instructions themselves. In embodiments, volatile memory can include random access memory (RAM), dynamic random-access memory (DRAM), or static random-access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Processor 306 and/or memory 308 can comprise instructions that, when executed, implement an encryption key building tool 310, a MAC computing tool 312, a data log 314. In embodiments, the encryption key building tool 310, the MAC computing tool 312, and the data log 314 can be substantially similar as those discussed above (encryption key building tool 110, MAC computing tool 120, and data log 130, respectively).

Processor 306 can further comprise instructions to implement a vehicle sensor engine 316 comprising a vehicle sensor configured to detect a characteristic or measurement of the vehicle. The vehicle sensor engine 316 is further configured to write the characteristic of the vehicle and a timestamp of the occurrence of the characteristic or measurement to the vehicle data log 314.

Server 304 generally comprises a processor 318 and operably coupled memory 320. Processor 318 and/or memory 320 can comprise instructions that, when executed, implement a message base, a set of check rules 324, a check determination tool 326, and a check tool 328. In embodiments the message base, the set of check rules 324, the check determination tool 326, and the check tool 328 can be substantially similar as those discussed above (message base 140, check rules 151, check determination tool 150, and check tool 160, respectively).

Figure 4:
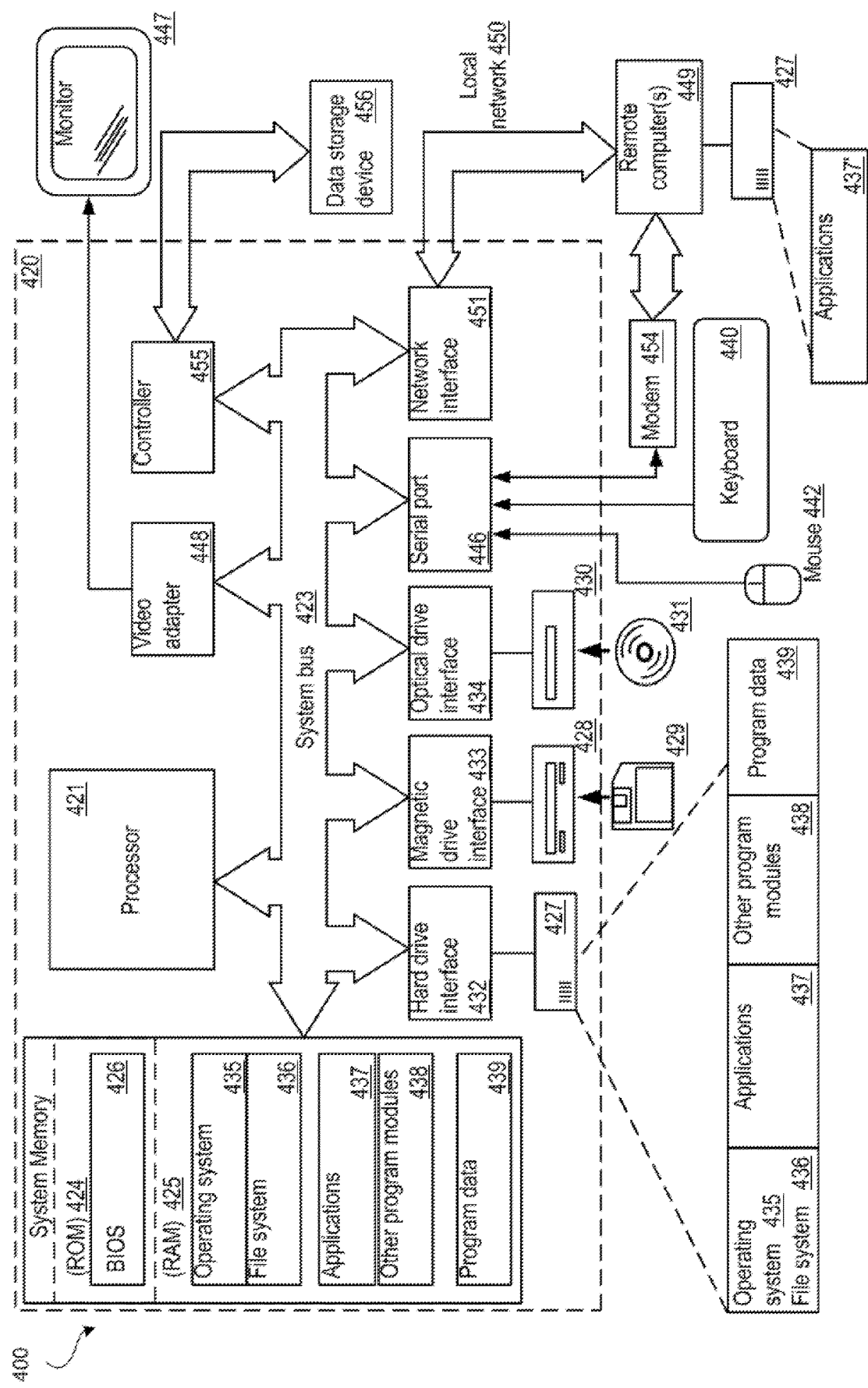
FIG. 4 is a block diagram of a computer system configured to implement embodiments.

Referring to FIG. 4, a diagram illustrating in greater detail a computer system 400 on which aspects of the invention as described herein may be implemented according to various embodiments is depicted.

The computer system 400 can comprise a computing device such as a personal computer 420 includes one or more processing units 421, a system memory 422 and a system bus 423, which contains various system components, including a memory connected with the one or more processing units 421. In various embodiments, the processing units 421 can include multiple logical cores that are able to process information stored on computer readable media. The system bus 423 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 424 or volatile memory such as Random Access Memory (RAM) 425. The Basic Input/Output System (BIOS) 426 contains basic procedures ensuring transfer of information between the elements of personal computer 420, for example, during the operating system boot using ROM 424.

Personal computer 420, in turn, has a hard drive 427 for data reading and writing, a magnetic disk drive 428 for reading and writing on removable magnetic disks 429, and an optical drive 430 for reading and writing on removable optical disks 431, such as CD-ROM, DVD-ROM and other optical media. The hard drive 427, the magnetic drive 428, and the optical drive 430 are connected with system bus 423 through a hard drive interface 432, a magnetic drive interface 433 and an optical drive interface 434, respectively. The drives and the corresponding computer information media represent energy-independent means for storage of computer instructions, data structures, program modules and other data on personal computer 420.

The system depicted includes hard drive 427, a removable magnetic drive 429 and a removable optical drive 430, but it should be understood that it is possible to use other types of computer media, capable of storing data in a computer-readable form (solid state drives, flash memory cards, digital disks, random-access memory (RAM), etc.), connected to system bus 423 through a controller 455.

The computer 420 comprises a file system 436, where the recorded operating system 435 is stored, as well as additional program applications 437, other program engines 438 and program data 439. The user can input commands and information into the personal computer 420 using input devices (keyboard 440, mouse 442). Other input devices (not shown) can also be used, such as: a microphone, a joystick, a game console, a scanner, etc. Such input devices are usually connected to the computer system 420 through a serial port 446, which, in turn, is connected to a system bus, but they can also be connected in a different way—for example, using a parallel port, a game port or a Universal Serial Bus (USB). The monitor 447 or another type of display device is also connected to system bus 423 through an interface, such as a video adapter 448. In addition to monitor 447, personal computer 420 can be equipped with other peripheral output devices (not shown), such as speakers, a printer, etc.

Personal computer 420 is able to work in a network environment; in this case, it uses a network connection with one or several other remote computers 449. Remote computer(s) 449 is (are) similar personal computers or servers, which have most or all of the above elements, noted earlier when describing the substance of personal computer 420 shown in FIG. 4. The computing network can also have other devices, such as routers, network stations, peering devices or other network nodes.

Network connections can constitute a Local Area Network (LAN) 450 and a World Area Network (WAN). Such networks are used in corporate computer networks or in corporate intranets, and usually have access to the Internet. In LAN or WAN networks, personal computer 420 is connected to the Local Area Network 450 through a network adapter or a network interface 451. When using networks, personal computer 420 can use a modem 454 or other means for connection to a world area network, such as the Internet. Modem 454, which is an internal or an external device, is connected to system bus 423 through serial port 446. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for detecting compromised data, the system comprising:
   at least one processor and a memory operably coupled to the at least one processor; and
   instructions that, when executed on the at least one processor, cause the at least one processor to implement:
   an encryption key building tool configured to—
   provide a Hardware Security Module (HSM) to physically protect the encryption key building tool from tampering,
   build an initial pre-shared key during creation of the HSM, the initial pre-shared key based on at least one characteristic of the HSM,
   build an encryption key based on a previously-built key, wherein a first instance of the encryption key is based on the initial pre-shared key, and
   provide the encryption key to a message authentication code (MAC) computing tool.

2. The system of claim 1, wherein the HSM is configured to provide real-time data as the at least one characteristic of the HSM and the encryption key building tool is further configured to build the initial pre-shared key based on the real-time data provided by the HSM.

3. The system of claim 2, wherein the HSM includes:
   a real-time clock configured to generate a current time, wherein the real-time data provided by the HSM is the current time.

4. The system of claim 3, wherein the encryption key building tool utilizes the current time to build the initial pre-shared key such that an attacker is unable to assign data log records earlier than the current time.

5. The system of claim 1, wherein the instructions that, when executed on the at least one processor, cause the at least one processor to further implement:
   the MAC computing tool, the MAC computing tool configured to—
   receive the encryption key from the encryption key building tool;
   intercept a first message;
   generate a MAC for the first message using the initial pre-shared key and the first message, the initial pre-shared key being shared with the MAC computing tool prior to intercepting the first message;
   intercept a second message;
   build a data block including the second message and the MAC generated for the first message;
   generate a MAC for the second message based on the encryption key and the data block built for the second message; and write a record to a data log, the record including the first message and the second message and the MAC generated for the second message.

6. The system of claim 5, wherein the HSM is configured to generate a current time and a new initial preset key based on the current time, and the MAC computing tool is further configured to evaluate the new initial preset key for validity against the current time.

7. The system of claim 5, wherein the HSM is configured to generate a current time and the initial pre-shared key based on the current time, and the MAC computing tool is further configured to restore the initial pre-shared key using the current time.

8. The system of claim 7, wherein the MAC computing tool is further configured to evaluate the current time for validity against the restored initial pre-shared key.

9. The system of claim 5, wherein the instructions that, when executed on the at least one processor, cause the at least one processor to further implement:
a check tool configured to—
generate an expected MAC using the initial pre-shared key and the record;
determine whether the MAC for the second message in the record matches the expected MAC; and
indicate data is compromised when MAC for the second message in the record does not match the expected MAC.

10. A method for detecting compromised data, the method comprising:
providing a Hardware Security Module (HSM) to physically protect an encryption key building tool from tampering;
building an initial pre-shared key during creation of the HSM, the initial pre-shared key based on at least one characteristic of the HSM; and
building an encryption key based on a previously-built key, wherein a first instance of the encryption key is based on the initial pre-shared key.

11. The method of claim 10, wherein the HSM is configured to provide real-time data as the at least one characteristic of the HSM, the method further comprising:
building the initial pre-shared key based on the real-time data provided by the HSM.

12. The method of claim 11, wherein the HSM includes a real-time clock configured to generate a current time, wherein the real-time data provided by the HSM is the current time.

13. The method of claim 12, further comprising:
utilizing the current time to build the initial pre-shared key such that an attacker is unable to assign data log records earlier than the current time.

14. The method of claim 10, further comprising:
intercepting a first message;
generating a MAC for the first message using the initial pre-shared key and the first message;
intercepting a second message;
building a data block including the second message and the MAC generated for the first message;
generating a MAC for the second message based on the encryption key and the data block built for the second message; and
writing a record to a data log, the record including the first message and the second message and the MAC generated for the second message.

15. The method of claim 14, wherein the HSM is configured to generate a current time and a new initial preset key based on the current time, the method further comprising:
evaluating the new initial preset key for validity against the current time.

16. The method of claim 14, wherein the HSM is configured to generate a current time and the initial pre-shared key based on the current time, the method further comprising:
restoring the initial pre-shared key using the current time.

17. The method of claim 16, further comprising:
evaluating the current time for validity against the restored initial pre-shared key.

18. The method of claim 14, further comprising:
generating an expected MAC using the initial pre-shared key and the record;
determining whether the MAC for the second message in the record matches the expected MAC; and
indicating data is compromised when MAC for the second message in the record does not match the expected MAC.

* * * * *